United States Patent
Knupfer et al.

[15] 3,681,397
[45] Aug. 1, 1972

[54] PROCESS FOR THE PRODUCTION OF 3-SUBSTITUTED 7-AMINO-COUMARINS

[72] Inventors: Hans Knupfer, Berg. Neukirchen; Carl-Wolfgang Schellhammer, Opladen, both of Germany

[73] Assignee: Farbenfabriken Bayer Aktiengesellschaft, Leverkusen, Germany

[22] Filed: Aug. 21, 1969

[21] Appl. No.: 852,105

[30] Foreign Application Priority Data

Aug. 23, 1968 Germany............P 17 93 262.6

[52] U.S. Cl...260/343.2 R, 260/332.2 H, 260/296 B, 260/309.2, 260/465 E, 260/296 R, 260/332.3 R
[51] Int. Cl. ............................................. C07d 7/24
[58] Field of Search.....260/332.2 H, 343.2 R, 296 B, 260/309.2

[56] References Cited

UNITED STATES PATENTS 3,514,471  5/1971  Yanagisawa et al. ......260/343.2

*Primary Examiner*—John M. Ford
*Attorney*—Plumley & Tyner

[57] ABSTRACT

Process for the production of 3-substituted 7-aminocoumarins of the general formula

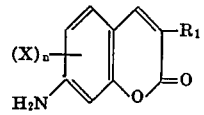

in which X stands for hydrogen or a substituent; $n$ denotes the numbers 1 to 3; and $R_1$ denotes an optionally substituted phenyl or napthyl group, an aromatic-heterocyclic radical which is attached via a C—C bond, on a carboxyl group, characterized in that substituted β-phenyl-acrylic acid nitriles of the general formula

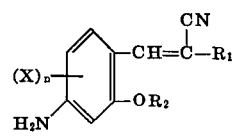

in which $R_1$, X and $n$ have the same meaning as above; and $R_2$ stands for a radical

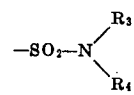

where $R_3$ and $R_4$ denote an alkyl radical, for a radical —$SO_3Z$ where Z denotes H or a metal atom, or for a radical —$CH_2OR_5$ where $R_5$ denotes an alkyl, aralkyl, or aryl radical, are heated in an aqueous-acidic medium, optionally in the presence of a water miscible or water-immiscible organic solvent, at temperatures of about 80°–200° C.

5 Claims, No Drawings

PROCESS FOR THE PRODUCTION OF 3-SUBSTITUTED 7-AMINO-COUMARINS

The present invention relates to a process for the production of 3-substituted 7-amino-coumarins of the general formula

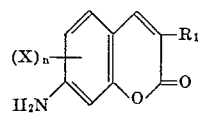

in which X stands for hydrogen or a substituent; $n$ denotes the numbers 1 to 3; and $R_1$ means an optionally substituted phenyl or naphthyl group, an aromatic-heterocyclic ring attached via a C—C bond, or a carboxyl group.

The process according to the invention consists in that substituted β-phenyl-acrylic acid nitriles of the general formula

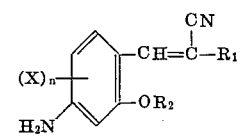

in which $R_1$, X and $n$ have the same meaning as above; $R_2$ stands for a radical

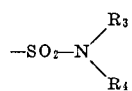

where $R_3$ and $R_4$ denote an alkyl radical, or for a radical —$SO_3Z$ where Z denotes H or a metal atom, preferably an alkali metal atom such as Na or K, or for a radical —$CH_2OR_5$ where $R_5$ denotes an alkyl, aralkyl or aryl radical, are heated in an aqueous-acidic medium, optionally in the presence of an organic solvent which may or may not be miscible with water, at temperatures of about 80°–200° C, preferably at temperatures of 100°–150° C.

When the process is carried out according to the invention, hydrolysis of the nitrile group, elimination of the protective group $R_2$, and closure of the coumarin ring take place in one operation. The reaction products are isolated in the usual way, for example, by cooling and filtering off with suction.

In general, the process according to the invention is carried out by heating 1 mol of the substituted β-phenyl-acrylic acid nitrile of the formula (II) in an aqueous medium, optionally under pressure, in the presence of at least 2 mol of a mineral acid, for example, sulphuric acid, hydrochloric acid, hydrobromic acid, hydroiodic acid, perchloric acid or phosphoric acid, optionally in the presence of a water-miscible organic solvent, e.g., acetic acid, or a water-immiscible solvent, e.g., chlorobenzene or o-dichlorobenzene, at 80°–200° C, preferably 100°–150° C, for about 1 to 20 hours, and subsequently isolating the reaction product in the usual way.

Suitable radicals $R_1$ are, for example, phenyl or naphthyl radicals which may be substituted by alkyl, alkoxy or halogen, as well as optionally substituted thienyl, pyridyl, or benzimidazolyl radicals. Suitable starting compounds are, for example, those set out in the following Table (the numbers in brackets refer to the position of the substituent).

TABLE

Compounds of the formula:

| $R_2$ | X | $R_1$ |
|---|---|---|
| —$SO_2N(CH_3)_2$ | H | phenyl |
| —$SO_2N(CH_3)_2$ | H | 4-methylphenyl |
| —$SO_2N(CH_3)_2$ | H | 4-methoxyphenyl |
| —$SO_2N(CH_3)_2$ | H | 2,5-dimethylphenyl |
| —$SO_2N(CH_3)_2$ | H | 2-chlorophenyl |
| —$SO_2N(CH_3)_2$ | H | 4-chlorophenyl |
| —$SO_2N(CH_3)_2$ | H | 2,4-dichlorophenyl |
| —$SO_2N(CH_3)_2$ | H | naphthyl |
| —$SO_2N(CH_3)_2$ | H | naphthyl |
| —$SO_2N(CH_3)_2$ | H | thienyl |
| —$SO_2N(CH_3)_2$ | H | pyridyl |
| —$SO_2N(CH_3)_2$ | H | benzimidazolyl |
| —$SO_2N(CH_3)_2$ | H | —$CO_2H$ |
| —$SO_2N(C_2H_5)_2$ | H | phenyl |
| —$SO_2N$(piperidino) | H | phenyl |
| —$SO_2N(CH_3)_2$ | $CH_3$(6) | phenyl |
| —$SO_3Na$ | H | phenyl |
| —$SO_3Na$ | H | phenyl |
| —$OCH_2OCH_3$ | H | phenyl |

The compounds of the formula (II) can be obtained, for example, by first treating toluene derivatives of the general formula

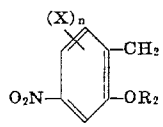 (III)

in which X, n and R₂ have the same meaning as above, in an aqueous-alkaline medium, preferably in the presence of organic solvents, at temperatures of about 50° to 120° C with an alkali metal polysulphide, and subsequently reacting the product, without intermediate isolation, preferably at temperatures of 20° to 120° C, with nitriles of the formula $$R_3 — CH_2 — CN \quad (IV)$$

in which R₃ denotes an optionally substituted phenyl or naphthyl group, an aromatic-heterocyclic radical which is linked to the group CH₂ via a carbon atom, a carboxyl, carboxamide or carboxylic ester group, and subsequently isolating the reaction products in the usual way, for example, by cooling, possibly acidification, and filtering off with suction. The carboxamide and carboxylic ester groups are thus converted into carboxylic acid groups.

The process described above is usually carried out by mixing a solution of the toluene derivative (III) at temperatures of about 50° to 120° C in an organic water-miscible solvent, for example, an alcohol or dimethyl sulphoxide, with at least the amount of an aqueous-alkaline polysulphide solution required for reduction of the nitro group or oxidation of the methyl group, heating at 50° to 120° C for about ½ to 3 hours, subsequently adding, possibly after cooling, about 0.7 to 1 mol of the nitrile (IV), heating for a prolonged time, if desired, and subsequently isolating the reaction product in the usual way.

Suitable toluene derivatives of the formula (III) are, for example:
N,N-dimethyl-sulphamic acid-(2-methyl-5-nitro-phenyl) ester, (2-N,N-dimethyl-sulphamidoxy-4-nitro-toluene), N,N-dimethyl-sulphamic acid-(2,4-dimethyl-5-nitro-phenyl) ester, the Na- or K-salt of sulphuric acid-(2-methyl-5-nitro-phenyl) semiesters, 2-(methoxy-methoxy)-4-nitro-toluene.

Suitable nitriles of the general formula (IV) are, for example: phenyl-acetonitrile, p-tolyl-acetonitrile, m-tolyl-acetonitrile, (3,5-dimethyl-phenyl)-acetonitrile, (4-chloro-phenyl)-acetonitrile, (3,4-dichlorophenyl)-acetonitrile, (4-methyl-sulphonylphenyl)-acetonitrile, (4-methoxy-phenyl)-acetonitrile, naphthyl-1-acetonitrile, naphthyl-2-acetonitrile, thienyl-2-acetonitrile, pyridine-2-acetonitrile, pyridine-3-acetonitrile, pyridine-4-acetonitrile, cyanoacetic acid and cyanoacetic acid ethyl ester.

Suitable solvents for the preparation of the aqueous-organic medium are primarily lower alcohols, for example, methanol, ethanol and propanol, and also dimethyl sulphoxide.

The term alkali metal polysulphides refers to polysulphides which can be obtained by dissolving sulphur in an aqueous alkali metal hydroxide and/or alkali metal sulphide, the preferred alkali metal compounds being the sodium or potassium compounds.

It was already known from Swiss Pat. specification No. 341,834, to convert α-aryl-β-(2-alkoxy-4-acylamino)-acrylo-nitriles in a two-step reaction into the corresponding 3-substituted 7-amino-coumarins; in this process, strong acids in an anhydrous medium were used as condensation or splitting agent, and after condensation the acylamino group was hydrolyzed to form the free amino group. It was therefore new and completely surprising that 3-substituted 7-amino-coumarins can be obtained in a simple manner with high yields and high degrees of purity in a single-step process by condensation in an aqueous medium.

The amino-coumarins of the formula (I) which can be obtained according to the invention are known. They are optical brighteners or valuable intermediates for the production of optical brighteners which are obtained, for example, by alkylation or acylation of the amino-group in the 7-position. The preparation of such brighteners is described, for example, in U.S. Pat. Nos. 2,881,286; 2,929,822; 2,945,033; 2,242,177; and in Belgian Pat. Specification No. 660,602.

Example 1

155 Parts α-phenyl-β-(2-N,N-dimethyl-sulphamidoxy-4-amino-phenyl)-acrylonitrile are heated in a mixture of 450 parts of water and 830 parts of concentrated sulphuric acid at 130° C for 7 hours while stirring. After cooling to about 20° C, the product is filtered off with suction and washed with 1–2 percent sulphuric acid. The filter cake is suspended in 500 parts of water and the suspension adjusted to pH 8–9 with concentrated aqueous ammonia. After filtering off with suction, washing with water and drying, there are obtained 100 parts 7-amino-3-phenyl-coumarin coumarin of m.p. 209°–210° C.

If the α-phenyl-β-(2-N,N-dimethyl-sulphamidoxy-4-amino-phenyl)-acrylonitrile is replaced with corresponding amounts of the following substituted acrylonitriles, then the substituted coumarins indicated below are obtained in similar yields: α-(p-tolyl)-β-(2-N,N-dimethyl-sulphamidoxy-4-amino-phenyl)-acrylonitrile yields 3-p-tolyl-7-amino-coumarin of m.p. 225°–226° C;

α-(4-chlorophenyl)-β-(2-N,N-dimethylsulphamidoxy-4-amino-phenyl)-acrylonitrile yields 3-(4-chlorophenyl)-7-amino-coumarin of m.p. 267°–269° C;

α-(3,4-dichlorophenyl)-β-(2-N,N-dimethyl-sulphamidoxy-4-amino-phenyl)-acrylonitrile yields 3-(3,4-dichlorophenyl)-7-amino-coumarin of m.p. 225°–256° C;

α-phenyl-β-(2-hydrogensulphato-4-amino-phenyl)-acrylonitrile yields 3-phenyl-7-amino-coumarin of m.p. 208°–210° C.

Example 2

15 Parts α-(4-methoxy-phenyl)-β-(2-N,N-dimethyl-sulphamidoxy-4-amino-phenyl)-acrylonitrile are suspended in 60 parts of water, and 31.5 parts of glacial acetic acid and 83 parts of concentrated sulphuric acid are then added. The mixture is stirred at 114°–116° C for 8 hours, allowed to cool, the product is filtered off with suction and washed with 1–2 percent sulphuric acid. The filter cake is suspended in 50 parts of water and the suspension adjusted to pH 8–9 with a concentrated ammonia solution. After filtering off with suction, washing with water and drying, there are obtained 10 parts 3-(p-methoxy-phenyl)-7-amino-coumarin of m.p. 252°–253° C.

If the α-(4-methoxy-phenyl)-β-(2-N,N-dimethyl-sulphamidoxy-4-amino-phenyl)-acrylonitrile is replaced with corresponding amounts of the following substituted acrylonitriles, then the coumarins indicated below are obtained in similar yields:

α-(naphthyl-1)-β-(2-N,N-dimethyl-sulphamidoxy-4-amino-phenyl)-acrylonitrile yields 3-(naphthyl-1)-7-amino-coumarin of m.p. 247°–248° C;

α-(naphthyl-2)-β-(2-N,N-dimethyl-sulphamidoxy-4-amino-phenyl)-acrylonitrile yields 3-(naphthyl-2)-7-amino-coumarin of m.p. 239°–241° C;

α-(phenyl)-β-(2-N,N-dimethyl-sulphamidoxy-4-amino-5-methyl-phenyl)-acrylonitrile yields 3-phenyl-6-methyl-7-amino-coumarin of m.p. 219°–220° C;

α-(benzimidazolyl-2)-β-(2-N,N-dimethyl-sulphamidoxy-4-amino-phenyl)-acrylonitrile yields 3-(benzimidazolyl-2)-7-amino-coumarin of m.p. 342°–343° C;

α-phenyl-β-(2-(methoxy-methoxy)-4-amino-phenyl)-acrylonitrile yields 3-phenyl-7-amino-coumarin of m.p. 208°–210° C.

Example 3

22.5 Parts α-(thienyl-2)-β-(2-N,N-dimethyl-sulphamidoxy-4-amino-phenyl)-acrylonitrile are heated in a mixture of 100 parts of water, 105 parts of glacial acetic acid and 135 parts of concentrated sulphuric acid at 104°–106° C for 6 hours. After cooling, the product is filtered off with suction, washed with 1 – 2 percent sulphuric acid, the filter cake is suspended in 100 parts of water and the suspension adjusted to pH 8–9 with a concentrated ammonia solution. 12.6 Parts 3-(thienyl-2)-7-amino-coumarin of m.p. 231°–234° C are thus obtained. After recrystallization from chlorobenzene, the red-yellow crystal needles melt at 236°–237° C.

Example 4 C.

48 Parts α-(p-tolyl)-β-(2-N,N-dimethyl-sulphamidoxy-4-amino-phenyl)-acrylonitrile are heated in a mixture of 190 parts of water, 275 parts of concentrated sulphuric acid and 65 parts o-dichlorobenzene at 120°–130° C for 10 hours. After cooling, the product is filtered off with suction and the residue suspended in 200 parts of water is adjusted to pH 8–9 with a concentrated ammonia solution. 30 Parts 3-(p-tolyl)-7-amino-coumarin of m.p. 225°–226° C. are obtained.

Example 5 C

The starting compounds used in the Examples 1–4 can be obtained as follows:

a. A solution of 24 parts $Na_2S . 9 H_2O$, 19 parts NaOH and 10 parts of sulphur in 100 parts of water is added dropwise at boiling temperature to a solution of 54.5 parts (2-methyl-5-nitro-phenoxy)-dimethyl ether (prepared from 2-hydroxy-4-nitro-toluene and chlorodimethyl ether) in 158 parts ethanol and 100 parts of water. The mixture is boiled for 1 ½ hours, 28 parts benzyl cyanide are added, boiling is continued for 60 minutes and the mixture is allowed to cool to 20° C. After filtering off with suction and washing with 50 percent ethanol, there are obtained 21 parts α-phenyl-β-[2-(methoxy-methoxy)-4-amino-phenyl]-acrylonitrile of m.p. 85.5° to 86° C.

b. A solution of 13.2 parts $Na_2S . 3 H_2O$, 19 parts NaOH and 10 parts of sulphur in 100 parts of water is added dropwise within 10 to 20 minutes to a boiling solution of 72 parts N,N-dimethyl-sulphamic acid-(2-methyl-5-nitro-phenyl) ester (prepared from 2-hydroxy-4-nitro-toluene and N,N-dimethyl-sulphamic acid chloride) in 158 parts ethanol and 100 parts of water. The mixture is boiled for 1½ hours, 28 parts benzyl cyanide are then added, and boiling is continued for 30 minutes. The mixture is then cooled to 40° C. After filtering off with suction and washing with 50 percent ethanol, there are obtained 59.5 parts α-phenyl-β-(2-N,N-dimethyl-sulphamidoxy-4-amino-phenyl)-acrylonitrile of m.p. 153°–154° C.

If the benzyl cyanide is replaced with corresponding amounts of the following substituted acetonitriles, then the acrylonitriles indicated below are obtained in similar yields:

p-tolyl-acetonitrile yields α-(p-tolyl)-β-(2-N,N-dimethyl-sulphamidoxy-4-amino-phenyl)-acrylonitrile of m.p. 181°–182° C; 4-methoxybenzyl cyanide yields α-(4-methoxyphenyl)-β-(2-N,N-dimethyl-sulphamidoxy-4-amino-phenyl)-acrylonitrile of m.p. 169°–171° C;

4-chlorobenzyl cyanide yields α-(4-chlorophenyl)-β-(2-N,N-dimethyl-sulphamidoxy-4-amino-phenyl)-acrylonitrile of m.p. 198°–199° C;

3,4-dichlorobenzyl cyanide yields α-(3,4-dichlorophenyl)-β-(2-N,N-dimethyl-sulphamidoxy-4-amino-phenyl)-acrylonitrile of m.p. 195°–196° C;

naphthyl-1-acetonitrile yields α-(naphthyl-1)-β-(2-N,N-dimethyl-sulphamidoxy-4-aminophenyl)-acrylonitrile of m.p. 154°–156° C; naphthyl-2-acetonitrile yields α-(naphthyl-2)-β-(2-N,N-dimethyl-sulphamidoxy-4-aminophenyl)-acrylonitrile of m.p. 190°–192° C; thienyl-2-acetonitrile yields α-(thienyl-2)-β-(2-N,N-dimethyl-sulphamidoxy-4-aminophenyl)-acrylonitrile of m.p. 207°–208° C; pyridine-2-acetonitrile yields α-(pyridyl-2)-β-(2-N,N-dimethyl-sulphamidoxy-4-aminophenyl)-acrylonitrile of m.p. 168°–169° C.

c. A solution of 72 parts N,N-dimethyl-sulphamic acid-(2-methyl-5-nitro-phenyl) ester in 158 parts ethanol and 100 parts of water is mixed at boiling temperature with a solution of 24 parts $Na_2S . 9 H_2O$, 19 parts NaOH and 10 parts of sulphur in 100 parts of water. The mixture is boiled for 1½ hours, 26 parts cyanoacetic acid ethyl ester are added, and boiling is continued for 30 minutes. After cooling, the pH is adjusted to 5 to 6 with acetic acid. After filtering off with suction, there are obtained 35 parts α-carbohydroxy-β-(2-N,N-dimethyl-sulphamidoxy-4-aminophenyl)-acrylonitrile of m.p. 234° to 235° C (decomp.).

d. A solution of 38 parts benzimidazolyl-2-acetonitrile in 100 parts of a 10 percent sodium hydroxide solution is added at boiling temperature to a solution of 2-N,N-dimethyl-sulphamidoxy-4-amino-benzaldehyde prepared as in Example 4, the mixture is boiled for 1 hour, and $CO_2$ is introduced at boiling temperature until the precipitation is complete. After cooling and filtering off with suction, there are obtained 45 parts α-(benzimidazolyl-2)-β-(2-N,N-dimethyl-sulphamidoxy-4-amino-phenyl)-acrylonitrile of m.p. 231° to 233° C.

e. A solution of 24 parts $Na_2S \cdot 9 H_2O$, 27 parts NaOH and 10 parts of sulphur in 100 parts of water is added dropwise to a boiling solution of 76 parts 2-N,N-dimethyl-sulphamidoxy-4-nitro-1,5-dimethyl-benzene in 158 parts ethanol and 100 parts of water. The mixture is boiled for 1½ hours, 28 parts benzyl cyanide are then added, and boiling is continued for ½ hour. After cooling to 30° C and filtering off with suction, there are obtained 34.5 parts α-phenyl-β-(2-N,N-dimethyl-sulphamidoxy-4-amino-5-methyl-phenyl)-acrylonitrile of m.p. 143° to 144° C.

f. A solution of 24 parts $Na_2S \cdot 9 H_2O$, 19 parts NaOH and 10 parts of sulphur in 100 parts of water is poured within 15 to 20 minutes into a boiling solution of 70.5 parts of the sodium salt of sulphuric acid-(2-methyl-5-nitro-phenyl) semiester in 158 parts ethanol and 100 parts of water. The mixture is boiled for 1½ hours, 28 parts benzyl cyanide are added, and boiling is continued for a further hour. After cooling, the mixture is acidified with a dilute sulphuric acid. The residue is dissolved in a 10 percent sodium carbonate solution and after clarification with active charcoal, the solution is reacidified with dilute sulphuric acid. There are thus obtained 25 parts of a yellow non-melting product which according to spectral findings has the structure of α-phenyl-β-(2-hydrogensulphato-4-amino-phenyl)-acrylonitrile.

We claim:

1. Process for the production of 3-substituted 7-amino-coumarin of formula

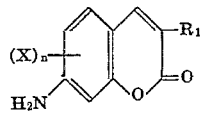

in which

X is hydrogen or methyl;
n is 1, 2 or 3;
$R_1$ is a radical attached via a C–C bond selected from the group consisting of phenyl; naphthyl; phenyl or naphthyl substituted with lower alkyl, lower alkoxy or halogen; benzimidazolyl; thienyl; pyridyl; and carboxyl;
X is hydrogen or methyl;
by heating a β-phenyl-acrylic acid nitrile of the formula

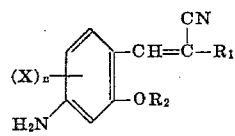

in which $R_1$, X and n have the same meaning as above;

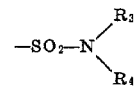

$R_3$ and $R_4$ are lower alkyl, or taken together, form the divalent radical $—(CH_2)_5—$;
Z is hydrogen or a metal atom; and
$R_5$ is methyl;
in an aqueous-acidic medium at temperatures of about 80°—200° C.

2. The process of claim 1 in which said reaction medium contains, in addition, a water-miscible organic solvent.

3. The process of claim 1 in which said reaction medium contains, in addition, a water-immiscible organic solvent.

4. The process of claim 1 in which the reaction is carried out in an aqueous-acidic medium which contains mineral acid in a molar ratio of at least 2:1 based on the nitrile.

5. The process of claim 1 which is conducted at a temperature of 100°–150° C.

* * * * *